United States Patent [19]

Hirose

[11] Patent Number: 4,923,190
[45] Date of Patent: May 8, 1990

[54] ORIGINAL PAPER TURNING OVER AND CONVEYING OUT APPARATUS

[75] Inventor: Akira Hirose, Tokyo, Japan
[73] Assignee: Ricoh Company, Ltd., Tokyo, Japan
[21] Appl. No.: 289,267
[22] Filed: Dec. 23, 1988
[30] Foreign Application Priority Data Dec. 28, 1987 [JP] Japan .................................. 62-333322
Dec. 28, 1987 [JP] Japan .................................. 62-333323
Oct. 28, 1988 [JP] Japan .................................. 63-272559

[51] Int. Cl.$^5$ ............................................ B65H 29/58
[52] U.S. Cl. ...................................... 271/3.1; 271/291; 271/902
[58] Field of Search ........................ 271/291, 902, 3.1

[56] References Cited

U.S. PATENT DOCUMENTS

| | | | |
|---|---|---|---|
| 4,411,517 | 10/1983 | Gerken | 271/902 X |
| 4,456,236 | 6/1984 | Buddendeck | 271/291 X |
| 4,579,326 | 4/1986 | Pinckney | 271/291 X |
| 4,815,722 | 3/1989 | Sugimoto | 271/291 X |

Primary Examiner—Richard A. Schacher
Attorney, Agent, or Firm—Oblon, Spivak, McClelland, Maier & Neustadt

[57] ABSTRACT

An original paper turning over and conveying out apparatus which comprises: an original paper processing portion for processing an original paper; an original paper stacking portion for stacking original papers; a first conveyor route; a discharge roller disposed at an outlet of the first conveyor route; a second conveyor route; a fixed pressing member; and a movable pressing member. The first conveyor route interconnects the processing portion and the stacking portion and able to convey the original paper in a forward direction from the processing portion to the stacking portion and vice versa in a backward direction. The second conveyor route diverges from the first conveyor route so that the original paper conveyed backward through the first conveyor route is guided to the second conveyor route and conveyed to the stacking portion. The original paper is discharged into the stacking portion in a state of being turned over through the discharge roller. The fixed pressing member always urges the original paper conveyed through the second conveyor route against the discharge roller to apply a discharging force thereto from the discharge roller. The movable pressing member selectively urges the original paper conveyed through the first conveyor route against the discharge roller.

14 Claims, 4 Drawing Sheets

ORIGINAL PAPER TURNING OVER AND CONVEYING OUT APPARATUS

BACKGROUND OF THE INVENTION

The present invention relates to an original paper turning over and conveying out apparatus which is applied to a copying apparatus as an automatic original paper feeding and discharging device. More particularly, the invention relates to the original paper turning over and conveying out apparatus which is especially useful for an original paper circulation type copying apparatus.

Conventionally, an automatic original feeding and discharging device provided with a turn over operation mode is known. In the turn over operation mode, a conveyed original paper is turned over by switching back the paper to reverse the conveying direction thereof and discharged out of the device.

A conventional automatic original paper feeding and discharging device is described first hereinafter. The conventional device comprises a switch back conveyor route which is diverged sideward from a main conveyor route and dead ended to be used only for turning over an original in a turn over operation mode. Original papers to be copied are stacked on an original stacking table. An original paper is taken from the table and fed to a platen glass through a feeding conveyor route and exposed on the platen glass so that the original is copied. Then the original paper is conveyed along the main conveyor route and enters into the switch back conveyor route through a changing lever which is selected to guide the original paper to the diverged switch back conveyor route in the turn over operation mode. The original paper is switched back there so that the leading end and the following end of the paper is reversed thus reversing the upper surface and the lower surface thereof. After that, the turned over original paper is discharged from the switch back conveyor route through a discharge roller and returned to the original stacking table through another discharge roller which is rotatable only in one direction.

In another example of the conventional automatic original feeding and discharging device, a switch back conveyor route is arranged above an outlet of a main conveyor route from which a conveyor route for turned over original papers is diverged. In the turn over operation mode, an original paper after being copied is guided to the switch back conveyor route and reversed the conveying direction to run back the main conveyor route, then being guided to the turned over original paper conveyor route diverged from the main conveyor route and discharged from an outlet of the conveyor route.

Still another example of the conventional automatic original feeding and discharging device is disclosed in Japanese Unexamined Patent Publication No. 61-80144. This example comprises a discharge roller which can be selectively driven in either direction forward or backward.

In the turn over operation mode, the discharge roller is driven backward to switch back the original paper using the main conveyor route in common as a switch back conveyor route. After turning the original paper over, the discharge roller is again driven forward to discharge the turned over original paper out of the device.

However, the above mentioned conventional automatic original turning over devices involve problems that the size of the device becomes large because of the provision of the special switch back conveyor route in addition to the main conveyor route or that the operation control of the switch back movement is very complicated in the case wherein the discharge roller which is rotatable both forward and backward is used.

Also, the conventional automatic original turning over and discharging device disclosed in Japanese Unexamined Patent Publication No. 61-80144 mentioned above has a problem that when one of original papers successively conveyed in series at a regular interval is accidentally delayed by being slipped or obliquely fed, the preceding delayed paper is prevented from being smoothly conveyed backward when the paper is to be turned over since the preceding delayed paper and the subsequent paper pass each other in the opposite directions in the common main conveyor route when the preceding paper is switched back in the turn over operation mode.

SUMMARY OF THE INVENTION

The present invention was made considering the above mentioned problems of the conventional turning over devices. It is therefore an object of the present invention to provide an automatic original turning over and conveying out apparatus which has a relatively compact size and makes it possible to simplify the original paper discharge function of the device in the turn over operation mode so that the turned over original paper is smoothly conveyed out of the device.

Also, considering the above mentioned problems, it is another object of the present invention to provide an automatic original turning over and conveying out apparatus in which even when an interval between successively conveyed original papers is accidentally shortened due to the preceding paper's delay by being slipped or obliquely fed, the preceding paper is smoothly switched back to be turned over and conveyed backward without being hindered or resisted by the following original paper proceeding forward in the turn over operation mode.

The first mentioned object of the invention can be achieved by an original paper turning over and conveying out apparatus comprising: an original paper processing portion; an original paper stacking portion; a first conveyor route which interconnects the original paper processing portion and the original paper stacking portion and which is able to convey an original paper in a forward direction from the original paper processing portion to the original paper stacking portion and vice versa; a discharge roller disposed at an outlet of the first conveyor route; a second conveyor route which is diverged from the first conveyor route so that the original paper which is being conveyed backward along the first conveyor route is introduced into the second conveyor route and guided to the original paper stacking portion through the second conveyor route, the original paper being discharged therefrom through the discharge roller disposed at the outlet of the first conveyor route in a turned over state; a fixed pressing member which always urges the original paper being discharged from the second conveyor route in the turned over state against the discharge roller to apply a discharging force to the original paper; and a movable pressing member which can be selectively urged to and away from the original paper conveyed through the first conveyor route so that the original paper being forwardly conveyed through the first conveyor route is pressed against the discharge roller to apply a discharge force thereto while being away from the original paper which is being backwardly conveyed through the first conveyor route to release the discharge force applied from the discharge roller to the original paper.

Also, the second object of the invention mentioned above can be achieved by an automatic original paper turning over and conveying out apparatus comprising: an original processing portion; an original stacking portion; a first conveyor route which interconnects an outlet of the original processing portion and the original stacking portion and which is able to convey an original paper in a forward direction from the original processing portion to the original stacking portion and vice versa; a discharge roller disposed at an outlet of the first conveyor route; a second conveyor route which is diverged from the first conveyor route at an inlet thereof so that the original paper which is being conveyed backward along the first conveyor route is introduced into the second conveyor route and guided to the original stacking portion through the second conveyor route, the original paper being discharged therefrom through the discharge roller disposed at the outlet of the first conveyor route in a turned over state; an inlet roller disposed at the inlet of the first conveyor route and able to be driven at least in the forward direction to convey the original paper toward the original stacking portion through the first conveyor route; and a pressing guide member comprising a leaf spring which is arranged so that the leaf spring urges the original paper transferred from the original processing portion against the inlet roller to apply a conveying force in the forward direction to the original paper to transfer it to the first conveyor route whereas the leaf spring guides the original paper being conveyed in the backward direction into the second conveyor route instead of urging the original paper against the inlet roller to apply the conveying force thereto in the forward direction.

Advantages are as follows, in accordance with the present invention with respect to the original paper turning over and conveying out apparatus which functions selectively in a regular operation mode wherein an original paper is not turned over and in a turn over operation mode wherein the original paper is switched back to reverse the leading end and the rear end thereof each other so that the original paper is turned over.

Advantages of the above mentioned first arrangement of the present invention are that the operation control for the discharge roller is simplified since the discharge roller is rotatable only in one same direction in the turn over operation mode as well as in the regular operation mode, that the structure is simplified and becomes small and compact since a special switch back conveyor route for exclusive use for turning over the original paper is not necessary, and that the original paper is smoothly discharged out of the apparatus since no excessive force acts on the original paper at the outlet of the conveyor route.

Also, advantages of the above mentioned second arrangement of the present invention are that two original papers can pass each other in the opposite directions in the conveyor route and that the original paper can be smoothly conveyed even if an interval between the successively transmitted original papers is accidentally shortened by being slipped or obliquely fed in the turn over operation mode.

Further objects and advantages of the present invention will be apparent from the following description of the preferred embodiments of the invention as illustrated in the accompanying drawings.

DESCRIPTION OF THE PREFERRED EMBODIMENTS

An embodiment of the present invention is described hereinafter with reference to the drawings.

Figure 1:
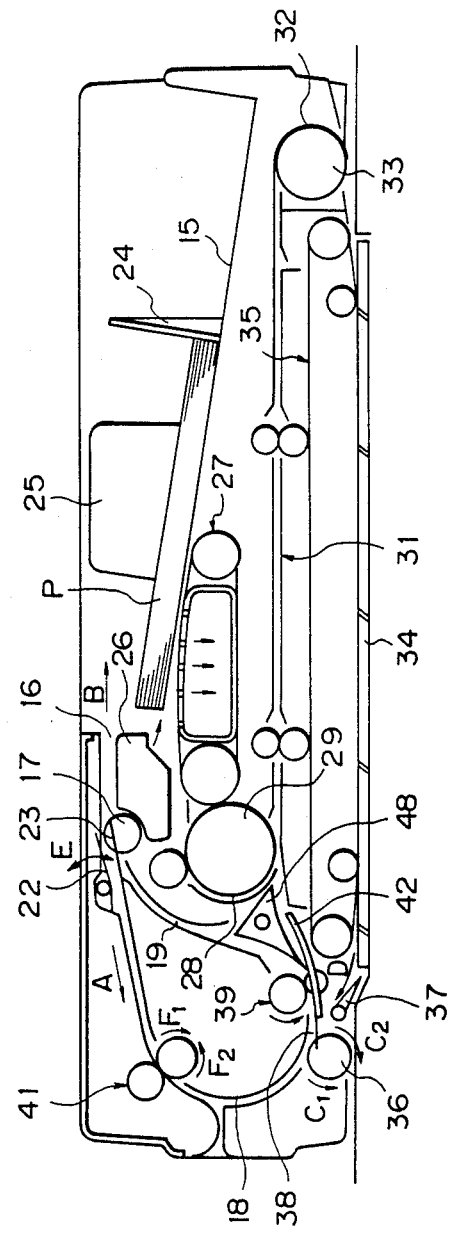
FIG. 1 is a schematic constructional view of an example of a circulation type original paper feeding and discharging device for a copying apparatus in cooperation with an original paper turning over and conveying out apparatus in accordance with the present invention.

FIG. 1 is a schematic constructional view which illustrates an embodiment of the automatic original paper feeding and discharging device in accordance with the present invention. Original papers P to be copied are stacked on a table 15. A lowermost original paper is taken out of the table and conveyed to a processing portion where the original is exposed and copied as described later. The original paper after being copied is conveyed out and returned to the table 15 through an original paper outlet 16. In a regular operation mode, the original paper is conveyed through a main conveyor route 18 which can also be used as a switch back conveyor route in the present invention and discharged directly to the table 15 through the outlet 16 as an arrow B without turning the original paper over. On the other hand, in a turn over operation mode, the original paper is conveyed backward as an arrow A after reaching the outlet 16 and guided into an auxiliary conveyor route for conveying a turned over original paper and discharged back to the table 15 through the outlet 16 as the arrow B. The operation mode can be selected by a user.

This automatic original paper feeding and discharging device comprises: the main conveyor route 18 through which the original paper is conveyed when the device is operated in the regular operation mode as well as in the turn over operation mode in common and which interconnects an outlet of the original processing portion in which the original is copied and the table 15 to which the original paper is returned; the auxiliary conveyor route 19 which is diverged from the main conveyor route 18 at an inlet portion thereof and through which the original paper is conveyed when the device is operated in the turn over operation mode; an inlet roller 36 disposed at the inlet portion of the main conveyor route 18 which roller 36 is selectively driven to rotate either in a forward direction as shown by an arrow C, to transfer the original paper P to the main conveyor route 18 and as well in a backward direction as shown by an arrow $C_z$; and a pressing guide piece 38 comprising a leaf spring disposed at the position of the inlet roller 36 to cooperate therewith in a manner that the pressing guide piece 38 urges the original paper P which is being conveyed in the forward direction toward the main conveyor route 18 as an arrow D against the inlet roller 36, and that on the other hand the pressing guide piece 38 guides the original paper toward and into the auxiliary conveyor route 19 from the main conveyor route 18 which original paper is being conveyed in the backward direction opposite to the arrow D through the main conveyor route 18 without urging the original paper against the inlet roller 36.

Also, this automatic original paper feeding and discharging device further comprises: a movable pressing member 22 which is disposed in the vicinity of the outlet 16 and rotatably mobable upward and downward as an arrow E so that the pressing member selectively urges the original paper conveyed through the main conveyor route 18 against a discharge roller 17 also disposed in the vicinity of the outlet 16 to apply a frictional discharging force to the original paper from the discharge roller in the direction of the arrow B and so that the pressing member is rotated upward to be away from the discharge roller so as not to apply the frictional discharge force to the original paper in the direction of the arrow B; and a fixed pressing member 23 which always urges the original paper which is being conveyed through the auxiliary conveyor route 19 against the discharge roller 17 so as to apply the frictional discharging force to the original paper from the discharge roller 17. In the turn over operation mode, the movable pressing member 22 is driven to move upward to release the discharging force of the discharge roller 17 in the direction of the arrow B acting to the original paper conveyed through the main conveyor route 18 whereas the original paper conveyed through the auxiliary conveyor route 19 is discharged through the outlet 16 to the table 15.

The automatic original paper feeding and discharging device of FIG. 1 further comprises: an end plate 24 and a side plate 25 each for aligning the edge of the pile of the original papers stacked on the table 15; a blower tank 26 which blows compressed air through a nozzle toward the stacked original papers as shown by an arrow to blowingly rise the stack; and a feeding device 27 which separates the lowermost original paper from the stack by a vacuum suction force and feeds the separated original paper to the copying portion.

Also, the automatic original paper feeding and discharging device further comprises: a first turn roller 29 disposed at a first turn route 28; a second turn roller 33 disposed at a second turn route 32; a horizontal conveyor route 31 which interconnects the first turn route and the second turn route and comprises two pairs of conveyor rollers; a conveyor device 35 which is disposed at a downstream side of the second turn route 32 for transferring the original paper P onto a platen glass 34 and which comprises a conveyor belt a part of which comes in contact with the platen glass 34; and a change lever 37 which is disposed at the inlet of the aforementioned main conveyor route 18. The platen glass 34 constitutes a part of an original processing portion i.e., a copying portion in this particular embodiment.

Also, the automatic original paper feeding and discharging device still further comprises: a taking in roller 39 which is disposed at the diverging point of the auxiliary conveyor route 19 from the main conveyor route 18 for taking the turned over original paper in and transferring it to the auxiliary conveyor route 19 from the main conveyor route 18; a diverging lever 48 for guiding the turned over original paper into the horizontal conveyor route 31 again so as to copy the rear side of the original paper again; and a drive roller 41 which is disposed on a middle of the main conveyor route 18 and rotatable in the forward direction and in the backward direction.

The automatic original paper feeding and discharging device having the above mentioned structure functions as follows. When the copying machine is started on the condition that a pile of original papers to be copied is placed on the original paper table 15, a lowermost original paper is separated from the pile due to the function of the blower tank 26 and the conveying device 27 and transferred to the horizontal conveyor route 31 through the first turn route 28 by the function of the first turn roller 29. The original paper is then transferred onto the platen glass 34 through the second conveyor route 32 by the function of the second turn roller 33 and the conveyor device 35. The original paper is stopped at a predetermined position on the platen glass 34 for being exposed and copied.

After the exposure process of the original paper for copying thereof, the original paper is discharged from the platen glass 34 and picked up by the change lever 37 so as to be conveyed into the main conveyor route 18 by the function of the pressing guide piece 38 which urges the original paper against the inlet roller 36 to apply a frictional conveying force to the original paper from the roller.

When the copying apparatus is operated in the regular operation mode, i.e., non-turn over operation mode, the original paper P is conveyed through the main conveyor route 18 by the drive roller 41 rotating in the forward direction as shown by an arrow $F_1$ and discharged through the outlet 16 onto the original paper table 15 by the function of the discharge roller 17 rotating in the same direction as the drive roller 41.

On the other hand, when the copying apparatus is operated in the turn over operation mode, instead of being directly discharged through the outlet 16, the original paper P is switched back after the rear end thereof reaches the inlet roller 36 to move backward by driving the roller 41 in the backward direction as shown by an arrow $F_z$. The original paper P is then guided toward the auxiliary conveyor route 19 along the upper surface of the pressing guide piece 38 and taken in into the auxiliary conveyor route 19 by the taking in roller 39. The original paper P is conveyed through the auxiliary conveyor route 19 and discharged through the outlet 16 onto the original table 15 in the state of being upside down i.e., an image side is reversed by being turned over, by the discharge function of the discharge roller 17 in cooperation with the fixed pressing member 23 which urges the turned over original paper against the discharge roller 17 to apply a frictional discharging force from the roller 17 to the original paper.

Note that when the turn over operation mode is selected, the movable pressing member 22 is moved upward and away from the discharge roller 17 as illustrated in FIG. 1 so that the discharging force in the direction of the arrow B is not applied to the original paper P which is being conveyed backward in the direction of the arrow A.

The structure of the auxiliary conveyor route 19 around the diverging portion thereof as well as the function thereof are described hereinafter in detail with reference to FIG. 2 and FIG. 3.

Figure 2:
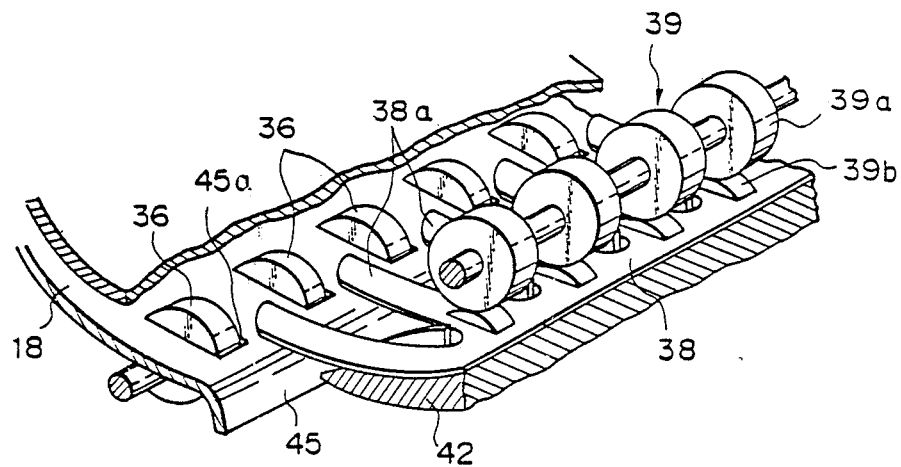
FIG. 2 is an enlarged perspective view of an inlet portion of a discharging route for conveying a turned over original paper out of the apparatus of FIG. 1.

A plurality of inlet rollers 36 (five rollers in this particular embodiment) are provided as illustrated in FIG. 2. Each of the inlet rollers 36 projects from a cut out hole 45a formed in a lower guide plate 45 which constitutes the floor of the main conveyor route 18 at the position corresponding to each inlet roller so that the inlet rollers 36 project into the main conveyor route 18 through the lower guide plate 45.

The pressing guide piece 38 comprises a plurality of tongues 38a made from a leaf spring to form a comb shape as illustrated in FIG. 2. Each tongue 38a is disposed between the inlet rollers 36 in a manner that a tip thereof comes in contact with the lower guide plate 45 with a predetermined springy force thereof which force does not impede the conveyance of the original paper P in the forward direction as shown by an arrow D in FIG. 3.

Note that the rear portion of the pressing guide piece 38 is secured to a guide member 42 for guiding the turned over original paper which guide member is secured to a not shown apparatus frame. The guide member 42 also supports axes of each pair of a drive roller 39a and a follower roller 39b constituting the taking in roller 39.

Figure 3:
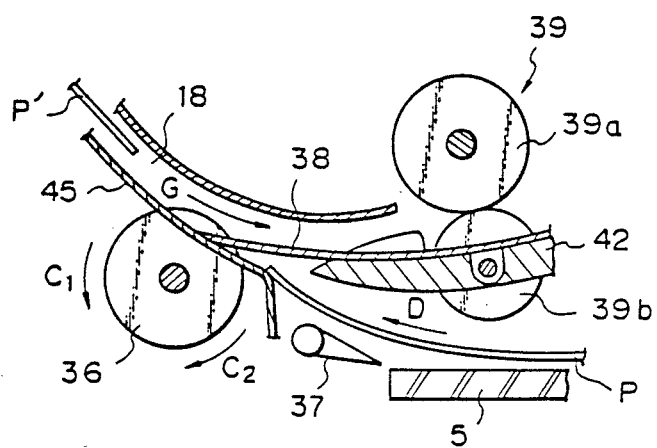
FIG. 3 is an enlarged sectional view of the inlet portion of the discharge route for conveying a turned over original paper out of the apparatus of FIG. 1.

With the above mentioned structure, the original paper P conveyed in the direction of the arrow D of FIG. 3 is transferred to the main conveyor route 18 from the platen glass 5, whereas the original paper P' being conveyed backward in the direction of an arrow G is guided into the auxiliary conveyor route 19.

The original paper feeding and discharging device mentioned above has an advantage when operated in the turn over operation mode and when one of the successively conveyed original papers is accidentally delayed by being for example slipped on the conveyor route so that, when it is switched back, the original paper P' being switched back in the direction of the arrow G and the subsequent original paper P conveyed in the direction of the arrow D pass each other at the inlet of the main conveyor route 18. The advantage is that the two original papers can be smoothly conveyed in the directions opposite to each other, respectively, since the frictional conveying force from the inlet roller 36 is applied only to the original paper P being conveyed in the forward direction of the arrow D but not applied or uninfluential to the original paper P' being conveyed backward in the direction of the arrow G due to the function of the pressing guide piece 38.

Note that the inlet roller 36 is driven to rotate in the direction of an arrow $C_z$ of FIG. 3 until the preceding end of the original paper P' being conveyed backward as shown by the arrow G reaches the taking in roller 39. After the taking in roller 39 receives the switched back original paper P', the inlet roller 36 is driven to rotate in the direction of an arrow $C_1$ to transfer the original paper P to the main conveyor route 18 from the platen 5 as shown by the arrow D. Feeding timing of the original paper is so arranged that the original paper from the platen side does not reach the inlet roller 36 during rotating in the direction of the arrow $C_z$ for conveying the preceding original paper in the backward direction.

As an alternative variant of the above mentioned arrangement, the inlet roller 36 may be so arranged that the roller is rotatable only in the direction of the arrow $C_1$ of FIG. 3.

Figure 4:
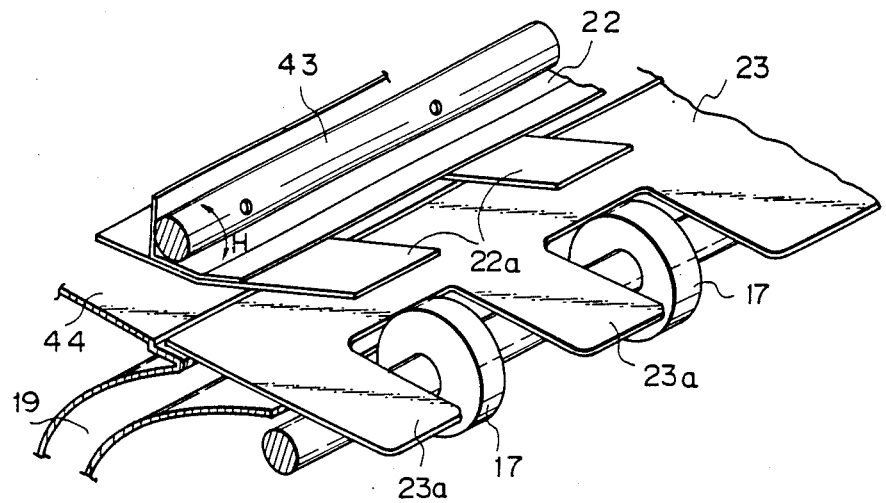
FIG. 4 is an enlarged perspective view of an outlet portion of the discharging route of FIG. 1 where a movable pressing member and a fixed pressing member are disposed.

The movable pressing member 22 and the fixed pressing member 23 each disposed around the outlet 16 of FIG. 1 are described hereinafter in detail with reference to FIG. 4 and FIG. 5.

The movable pressing member 22 is made from, for example, a springy thin plate and comprises a pivot shaft 43 secured on the springy plate by means of screws. The shaft 43 is rotatably supported by a not shown apparatus shaft 43 is rotatably supported by a not shown apparatus frame in a manner that the shaft can be driven to rotate in the clockwise direction and in the counterclockwise direction as shown by an arrow H in FIG. 4 by a not shown drive means such as a solenoid.

The fixed pressing member 23 is made from, for example, a springy thin plate as in the case of the movable pressing member. An end of the fixed pressing member 23 is secured to the lower guide plate 44 of the main conveyor route 18. The other end of the fixed pressing member 23 is cut out at a position corresponding to each of the discharge rollers 17 so as to form an actuating piece 23a which is disposed between the discharge rollers 17 as shown in FIG. 4. Each of the actuating pieces 23a is arranged below the top portion 17a of the discharge roller 17 as shown in FIG. 5.

Figure 5:
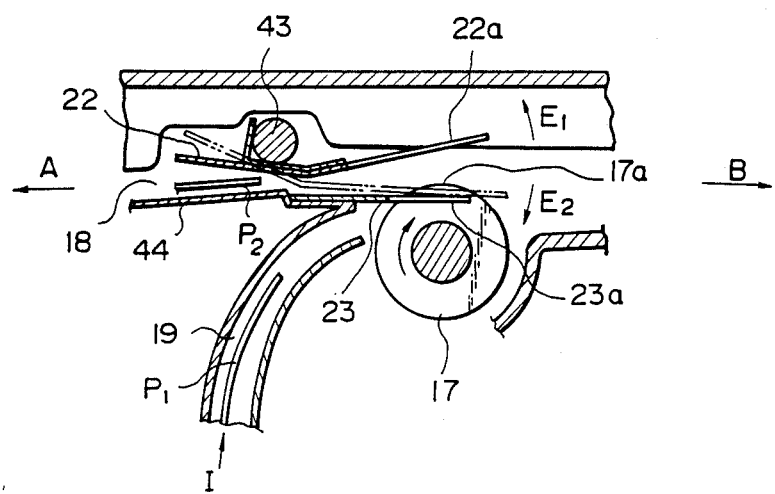
FIG. 5 is an enlarged sectional view of the outlet portion of the discharging route of FIG. 1 where the movable pressing member and the fixed pressing member are disposed.
Figure 6:
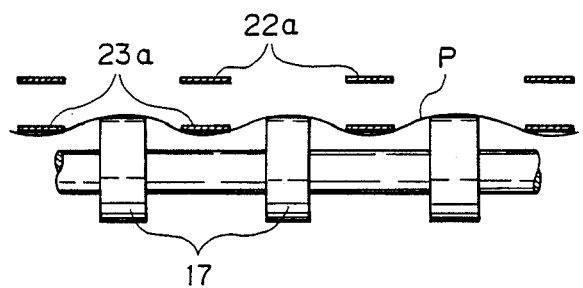
FIG. 6 is a sectional view for showing a relationship of the movable pressing member and the fixed pressing member with respect to the discharge roller.

Also, the movable pressing member 22 comprises movable actuating pieces 22a each arranged above the actuating piece 23a of the fixed pressing member 23 as can best be seen from FIG. 6. The movable pressing member 22 is so arranged that when the shaft 43 is driven to rotate the pressing member 22 in the downward direction as shown by an arrow $E_z$, each of the movable actuating pieces 22a positions below the top end 17a of the discharge roller 17, as depicted by a dash-two-dot line in FIG. 5.

With the arrangement mentioned above, the original paper $P_1$ conveyed in the direction of an arrow I through the auxiliary route 19 in FIG. 5 is always pressed against the discharge roller 17 so that the original paper $P_1$ is discharged in the direction of the arrow B. On the other hand, with regard to the original paper $P_z$ conveyed in the main conveyor route 18, when the movable pressing member 22 is rotated upward in the direction of the arrow $E_1$ when operated in the turn over operation mode, the original paper is not pressed against the discharge roller 17 so that the frictional discharging force from the discharge roller in the direction of the arrow B is not applied to the original paper. Therefore, the original paper $P_z$ is switched back in the direction of the arrow A due to the conveying force from the drive roller 41 (see FIG. 1) rotating in the backward direction. The switched back original paper is then guided into the auxiliary conveyor route 19 as mentioned before and discharged out of the device.

On the other hand, when the movable pressing member 22 is rotated in the direction of the arrow $E_z$ as depicted by the dash-two-dot line when operated in the regular operation mode, the original paper $P_2$ is pressed against the discharge roller 17 by the actuating pieces 22a as mentioned before so that the original paper is discharged directly out of the device as shown by the arrow B without being switched back.

As mentioned above, in accordance with the embodiment of the present invention, the main conveyor route is commonly used when operated in the turn over operation mode as well as in the regular operation mode without providing a special conveyor route exclusively used for switching back the original paper, which makes it possible to realize a compact automatic original feeding and discharging device.

Another advantageous point of the present invention is described hereinafter.

Figure 7:
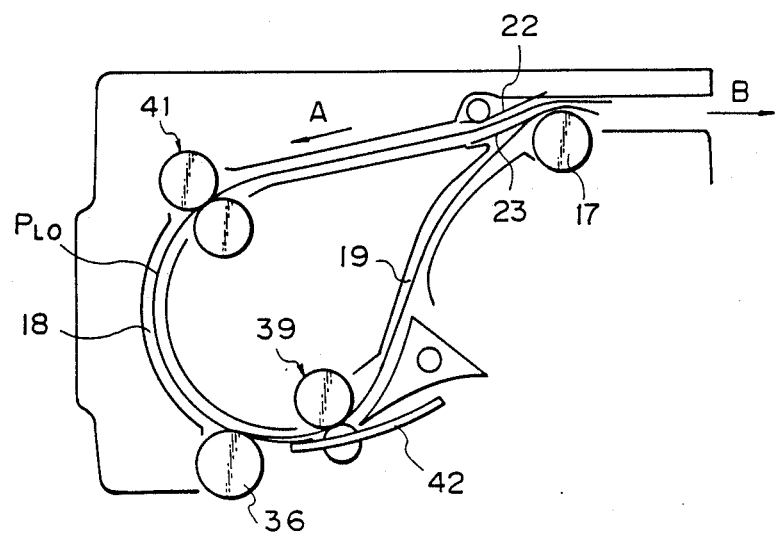
FIG. 7 is an explanatory view for showing a state in which both ends i.e., a preceding end and a rear end of an original paper come in contact with the discharge roller.

As illustrated in FIG. 7, when the length of the original paper $P_{LO}$ is longer than the total length of the main conveyor route 18 and the auxiliary conveyor route 19 that is when the original paper spans over the distance from the discharge roller 17 to the discharge roller 17, both ends of the original paper come in contact with the discharge roller 17 when operated in the turn over operation mode.

In that case, with the structure of the conventional turning over and conveying out apparatus in which the original paper is always urged against the discharge roller, the discharging force from the discharge roller in the direction of the arrow B in FIG. 7 is applied to the both ends of the original paper in addition to the backward force in the direction of the arrow A applied to the original paper to switch it back from the drive roller disposed on the main conveyor route, which causes jamming of the paper and impedes a smooth discharge movement of the paper.

On the other hand, with the structure in accordance with the present invention in which the movable pressing member 22 is provided for selectively applying and releasing the discharging force in the direction of the arrow B in FIG. 7 from the discharge roller to the original paper, it is possible to apply the discharging force only to the backwardly preceding end of the original paper conveyed back through the auxiliary conveyor route 19 by separating the movable pressing member away from the discharge roller to release the discharging force from the rear end of the original paper to be switched back. Therefore, the original paper is smoothly conveyed out from the device even when the both ends of the original paper come in contact with the discharge roller 17 when the original paper is longer than the distance between the discharge roller 17 and the same discharge roller 17 along the main conveyor route 18 and the auxiliary conveyor route 19. Accordingly, it is possible to shorten the length of the main conveyor route 18 and the auxiliary conveyor route 19, which makes it possible to realize a further compact and small original paper turning over and conveying out apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An original paper turning over and conveying out apparatus comprising:
   an original paper processing portion for processing an original paper;
   an original paper stacking portion for stacking original papers;
   a first conveyor route which interconnects said original paper processing portion and said original paper stacking portion and which is able to convey said original paper in a forward direction from said original paper processing portion to said original paper stacking portion and in a backward direction;
   a discharge roller disposed at an outlet of said first conveyor route;
   a second conveyor route diverging from said first conveyor route so that said original paper conveyed backward through said first conveyor route is guided to said second conveyor route and conveyed to said original paper stacking portion and that said original paper is discharged into said original paper stacking portion in a state of being turned over through said discharge roller disposed at the outlet of said first conveyor route;
   a fixed pressing member which always urges said original paper conveyed through said second conveyor route against said discharge roller to apply a discharging force to said original paper from said discharge roller; and
   a movable pressing member which selectively urges said original paper conveyed through said first conveyor route against said discharge roller so that said discharging force is applied to said original paper conveyed forward whereas said discharging force is not applied to said original paper conveyed backward.

2. An original paper turning over and conveying out apparatus according to claim 1, wherein said original paper processing portion comprises a copying device.

3. An original paper turning over and conveying out apparatus according to claim 1, wherein said original paper stacking portion is arranged as an original circulation type structure in which a lowermost original paper is taken from the stack of original papers and conveyed to said original processing portion, and in which said original paper after being processed is transferred back to the uppermost position of said stack of original papers.

4. An original paper turning over and conveying out apparatus according to claim 1, wherein a conveyor drive roller which can be driven to rotate both forward and backward is disposed in the middle of said first conveyor route.

5. An original paper turning over and conveying out apparatus according to claim 1, wherein a plurality of said discharge rollers are arranged side by side perpendicularly to the conveying direction of the original paper, each roller being rotatable only in a discharging direction to discharge the original paper.

6. An original paper turning over and conveying out apparatus according to claim 1, wherein said second conveyor route is diverged from said first conveyor route at an inlet of said first conveyor route.

7. An original paper turning over and conveying out apparatus according to claim 1, wherein said fixed pressing member comprises a leaf spring having cut out portions through which said discharge roller projects and secured to an apparatus frame in a manner that said original paper passes between said leaf spring and said discharge roller.

8. An original paper turning over and conveying out apparatus according to claim 1, wherein said movable pressing member comprises a leaf spring having cut out portions to receive said discharge roller and secured to a pivot shaft in parallel with a rotation axis of said discharge roller in a manner that said leaf spring can be moved toward and away from said discharge roller by driving said pivot shaft to rotate forward and backward, respectively.

9. An original paper turning over and conveying out apparatus according to claim 8, wherein said pivot shaft of said movable pressing member is driven by a solenoid.

10. An original paper turning over and conveying out apparatus comprising:
   an original paper processing portion for processing an original paper;
   an original paper stacking portion for stacking original papers;
   a first conveyor route which interconnects said original paper processing portion and said original paper stacking portion and which is able to convey said original paper in a forward direction from said original paper processing portion to said original paper stacking portion and in a backward direction;
   a discharge roller disposed at an outlet of said first conveyor route;
   a second conveyor route diverging from said first conveyor route at an inlet thereof so that said original paper conveyed backward through said first conveyor route is guided to said second conveyor route and conveyed to said original paper stacking portion and that said original paper is discharged into said original paper stacking portion in a state of being turned over through said discharge roller disposed at the outlet of said first conveyor route;
   an inlet roller which is disposed at the inlet of said first conveyor route and can be driven to rotate to convey said original paper in the forward direction through said first conveyor route; and
   a pressing guide member comprising a leaf spring which urges said original paper discharged from said original processing portion against said inlet roller to apply a forward conveying force to said original paper and which guides said original paper conveyed backward through said first conveyor route into said second conveyor route without applying a conveying force to said original paper from said inlet roller.

11. An original paper turning over and conveying out apparatus according to claim 10, wherein a plurality of said inlet rollers are disposed side by side on a rotational axis which is perpendicular to the conveying direction of said original paper.

12. An original paper turning over and conveying out apparatus according to claim 11, wherein a top portion of each of said inlet rollers is projected through and above a floor of said first conveyor route.

13. An original paper turning over and conveying out apparatus according to claim 12, wherein said pressing guide member comprises springy actuating pieces each of which is disposed between said inlet rollers and urges said original paper against said inlet rollers.

14. An original paper turning over and conveying out apparatus according to claim 10, wherein a drive roller is provided on said pressing guide member at an inlet of said second conveyor route, which drive roller takes in said original paper conveyed backward through said first conveyor route into said second conveyor route.

* * * * *